United States Patent
Wong et al.

(10) Patent No.: US 7,711,065 B2
(45) Date of Patent: May 4, 2010

(54) CIRCUIT FOR CANCELING DC OFFSET IN A COMMUNICATION SYSTEM

(75) Inventors: Kwo-Jyr Wong, Taipei Hsien (TW); Jane-Yi Pieh, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 557 days.

(21) Appl. No.: 11/616,866

(22) Filed: Dec. 28, 2006

(65) Prior Publication Data

US 2007/0237259 A1    Oct. 11, 2007

(30) Foreign Application Priority Data

Apr. 7, 2006    (TW) ............... 95112506 A

(51) Int. Cl.
*H04L 25/49*    (2006.01)
*H04B 1/04*    (2006.01)

(52) U.S. Cl. .................... 375/296; 455/114.2
(58) Field of Classification Search ............. 375/285, 375/296–297; 455/67.13, 114.2, 114.3
See application file for complete search history.

(56) References Cited

U.S. PATENT DOCUMENTS

| | | | |
|---|---|---|---|
| 6,222,878 B1 * | 4/2001 | McCallister et al. | ........ 375/225 |
| 6,384,677 B2 | 5/2002 | Yamamoto | |
| 6,421,398 B1 | 7/2002 | McVey | |
| 6,745,015 B2 | 6/2004 | Yochem | |
| 6,771,709 B2 | 8/2004 | Huang et al. | |
| 6,801,581 B1 | 10/2004 | Francos et al. | |
| 7,133,644 B2 * | 11/2006 | Demir et al. | ........... 455/67.11 |
| 7,369,820 B2 * | 5/2008 | Rahman | ............ 455/126 |
| 7,376,200 B2 * | 5/2008 | Demir et al. | ............ 375/296 |
| 7,394,869 B2 * | 7/2008 | Jensen et al. | ............ 375/302 |
| 7,551,688 B2 * | 6/2009 | Matero et al. | ............ 375/297 |
| 2005/0141634 A1 * | 6/2005 | Lin | ............ 375/295 |

FOREIGN PATENT DOCUMENTS

CN    1381090 A    11/2002

* cited by examiner

*Primary Examiner*—Khanh C Tran
(74) *Attorney, Agent, or Firm*—Wei Te Chung

(57) ABSTRACT

A circuit for canceling a direct current (DC) offset in a communication system includes a digital-to-analog (D/A) converter assembly (30), a summing circuit (40), an inphase-to-quadrature (I/Q) modulator (50), a detecting module (70), and a microcontroller (80). The D/A converter assembly converts digital DC offset regulation signals to analog DC offset regulation signals. The summing circuit sums up the DC offset regulation signals and corresponding vectors of a received base band signal. The I/Q modulator converts the summed base band signal to a radio frequency (RF) signal. The detecting module detects an energy variation due to DC offset contained in the radio frequency (RF) signal. The microcontroller regulates the DC offset regulation signals output from the D/A converter assembly to minimize the energy variation detected by the detecting module. In the invention, the circuit saves energy and enhances qualities of communication signals.

13 Claims, 4 Drawing Sheets

CIRCUIT FOR CANCELING DC OFFSET IN A COMMUNICATION SYSTEM

BACKGROUND OF THE INVENTION

1. Field of the Invention

The present invention relates to circuits for canceling direct current (DC) offsets, and particularly to a circuit for canceling DC offset in a wireless communication system.

2. Description of Related Art

In wireless communication systems, a base band signal is modulated to a radio frequency (RF) signal via a modulator, and then coupled to an antenna and subsequently transmitted. During the process, DC offset can be generated in the modulator, which leads to energy consumption when the RF signal is transmitted. The DC offset is harmful for the communication systems. For example, in a mobile phone, lifetime of a battery is shortened by power loss due to the DC offset, thereby reducing standby time of the mobile phone.

SUMMARY OF INVENTION

The present invention provides a circuit for canceling a direct current (DC) offset in a communication system, which includes a digital-to-analog (D/A) converter assembly, a summing circuit, an inphase-to-quadrature (I/Q) modulator, a detecting module, and a microcontroller. The D/A converter assembly converts digital DC offset regulation signals to analog DC offset regulation signals. The summing circuit sums up the DC offset regulation signals and corresponding vectors of a received base band signal. The I/Q modulator receives the summed base band signal, and converts the summed base band signal to a radio frequency (RF) signal. The detecting module detects an energy variation due to DC offset contained in the radio frequency (RF) signal. The microcontroller regulates the DC offset regulation signals output from the D/A converter assembly to minimize the energy variation detected by the detecting module.

Other advantages and novel features will become more apparent from the following detailed description when taken in conjunction with the accompanying drawings, in which:

DETAILED DESCRIPTION

Figure 1:
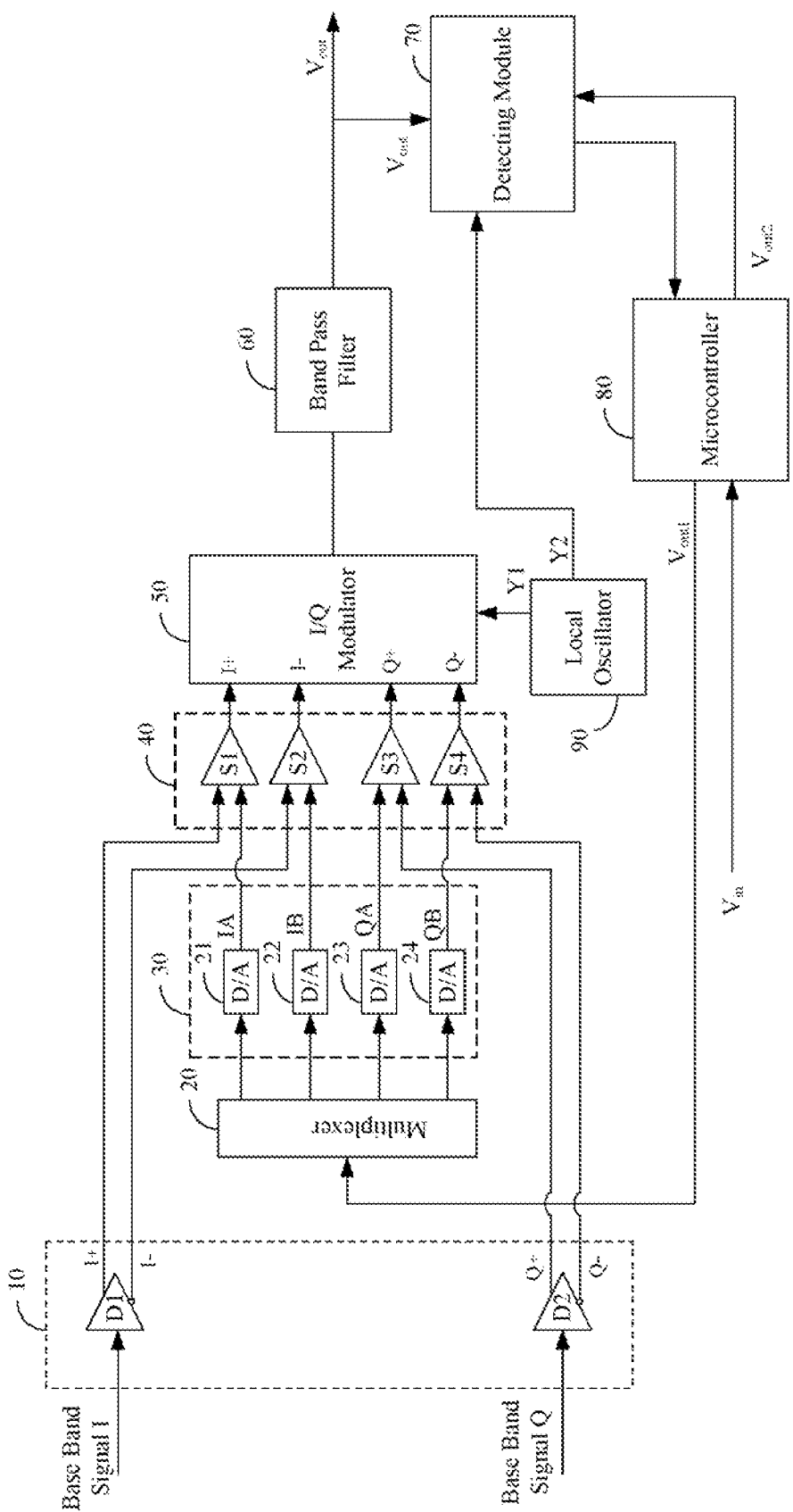
FIG. 1 is a block diagram of a circuit for canceling DC offset of an exemplary embodiment of the present invention.

FIG. 1 is a block diagram of a circuit for canceling DC offset of an exemplary embodiment of the present invention. The circuit includes a differential amplifier assembly 10, a multiplexer 20, a digital-to-analog (D/A) converter assembly 30, a summing circuit 40, an inphase-to-quadrature (I/Q) modulator 50, a band pass filter 60, a detecting module 70, a microcontroller 80, and a local oscillator 90.

The differential amplifier assembly 10 converts a received base band signal to a differential base band signal. Normally, the base band signal includes vectors I and Q. In the exemplary embodiment, the differential amplifier assembly 10 includes two differential amplifiers D1 and D2, for receiving the vectors I and Q, and converting the vectors I and Q to differential vectors I+, I−, Q+, and Q−.

The D/A converter assembly 30 includes a plurality of D/A converters 21, 22, 23, and 24, which converts digital DC offset regulation signals to analog DC offset regulation signals IA, IB, QA, and QB.

The summing circuit 40 includes a plurality of summators S1, S2, S3 and S4, which sum up the DC offset regulation signals IA, IB, QA and QB and the corresponding differential base band signal vectors I+, I−, Q+ and Q−, and transmit the summed differential base band signal vectors to corresponding pins I+, I−, Q+ and Q− of the I/Q modulator 50. That is, the first summator S1 sums up the DC offset regulation signal IA and the differential base band signal vector I+, and transmits that sum to the pin I+ of the I/Q modulator 50. The second summator S2 sums up the DC offset regulation signal IB and the differential base band signal vector I−, and transmits that sum to the pin I− of the I/Q modulator 50. The third summator S3 sums up the DC offset regulation signal QA and the differential base band signal vector Q+, and transmits that sum to the pin Q+ of the I/Q modulator 50. The fourth summator S4 sums the DC offset regulation signal QB and the differential base band signal vector Q−, and transmits that sum to the pin Q− of the I/Q modulator 50.

The I/Q modulator 50 converts the summed differential base band signal to a radio frequency (RF) signal. In the exemplary embodiment, the I/Q modulator 50 is a differential modulator, and input signals are differential signals. Therefore, the input base band signal is converted to the differential signal via the differential amplifier assembly 10, and then transmitted to the I/Q modulator 50.

In an alternative embodiment, the I/Q modulator 50 need not be a differential I/Q modulator, thus, the differential amplifier assembly 10 can be omitted as a base band signal is not converted to a differential signal, and can be directly transmitted to the I/Q modulator 50.

The band pass filter 60 is connected between the I/Q modulator 50 and the detecting module 70, for filtering RF signals outer of the normal operation band. Thus, the RF signal $V_{out}$ output from the band pass filter 60 is in the normal operation band.

The detecting module 70 detects an energy variation due to the DC offset contained in the RF signal $V_{out}$. Factors influencing the energy variation include DC offset, thermal noise and so on. However, in a prefect environment, average energy variation affected by the factors without the DC offset is nearly zero, and is distributed as predicted by the Gaussian curve, the energy variation detected by the detecting module 70 is only related to the DC offset, and directly varies with the DC offset.

The microcontroller 80 regulates the DC offset regulation signals IA, IB, QA, and QB output from the D/A converter assembly 30 according to the energy variation detected by the detecting module 70, thereby minimizing the energy variation. In the exemplary embodiment, the microcontroller 80 outputs two control signals $V_{out1}$ and $V_{out2}$. The control signal $V_{out1}$ is output to the multiplexer 20, for regulating the DC offset regulation signals IA, IB, QA, and QB output from the D/A converter assembly 30 to minimize the energy variation detected by the detecting module 70. The control signal $V_{out2}$ is output to the detecting module 70 (see FIG. 2). The multiplexer 20 is connected between the D/A converter assembly 30 and the microcontroller 80.

The local oscillator 90 is electrically connected between the I/Q modulator 50 and the detecting module 70, for generating two carrier wave signals Y1, Y2. The carrier wave signal Y1 is output to the I/Q modulator 50, and the carrier wave signal Y2 is output to the detecting module 70 (see FIG. 2).

In the exemplary embodiment, in order to save energy during communications, the circuit must correct DC offset generated in the I/Q modulator 50 before communication occurs.

Figure 2:
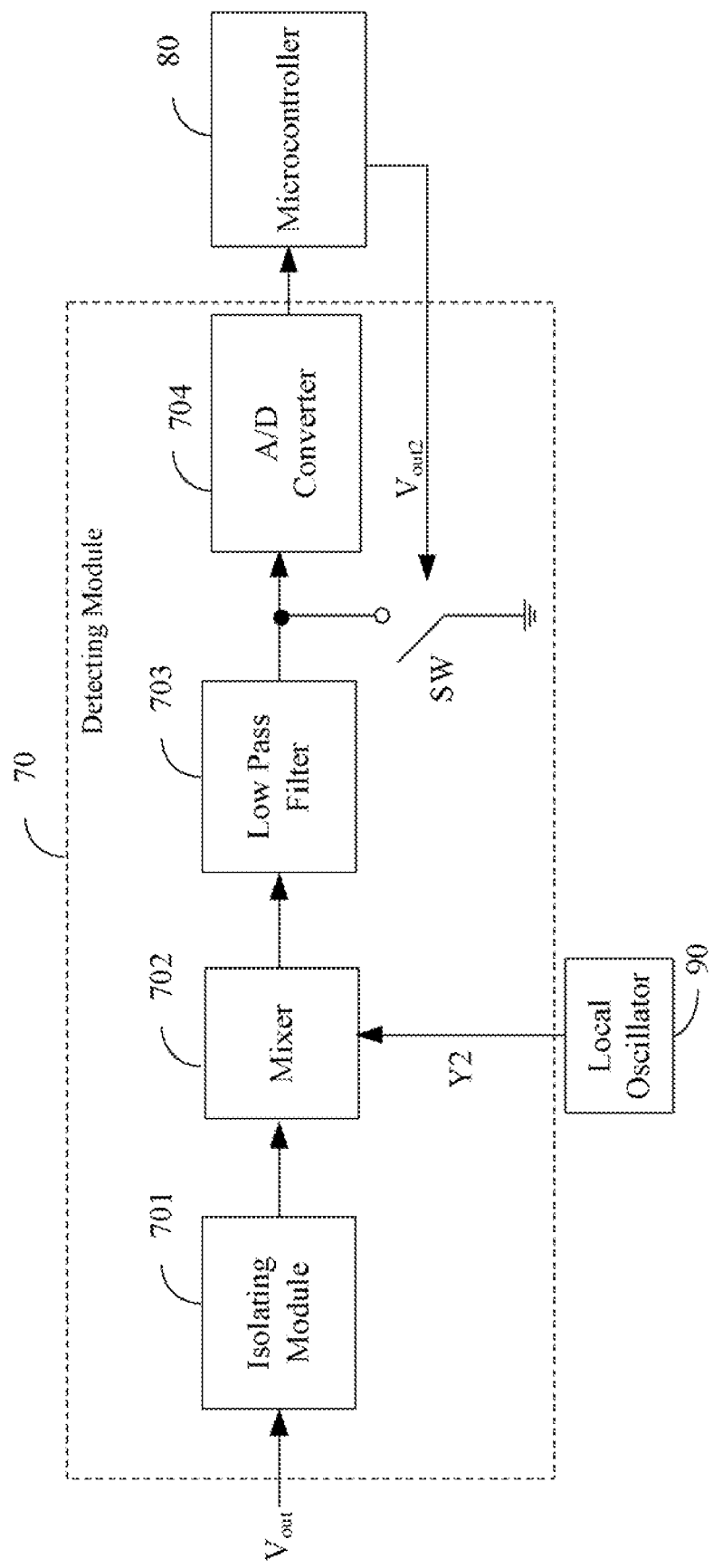
FIG. 2 is a detailed block diagram of a detecting module of FIG. 1 of the present invention.

FIG. 2 is a detailed block diagram of the detecting module 70 of FIG. 1. The detecting module 70 includes an isolating module 701, a mixer 702, a low pass filter 703, and an analog/digital (A/D) converter 704.

The isolating module 701 is connected between the band pass filter 60 and the mixer 702, for preventing the RF signal output from the detecting module 70 from being transmitted to the I/Q modulator 50 and generating harmful crosstalk. In the exemplary embodiment, the local oscillator 90 is electrically connected to the mixer 702, for providing the carrier wave signal Y2 to the mixer 702. Therefore, the RF signal $V_{out}$ is modulated to another base band signal in the mixer 702 with the carrier wave Y2.

The low pass filter 703 is connected to the mixer 702, for receiving the modulated base band signal, and filtering high frequency elements of the modulated base band signal. Then, a filtered base band signal output from the low pass filter 703 is converted to a digital base band signal via the A/D converter 704. In the exemplary embodiment, the modulated base band signal contains the high frequency elements and DC offsets.

The detecting module 70 further includes a switch SW connected between the low pass filter 703 and ground. In the exemplary embodiment, the control signal $V_{out2}$ of the microcontroller 80 is also output to the switch SW, for controlling on/off of the switch SW.

When there is a base band signal input to the circuit, the microcontroller 80 controls the switch SW to turn off via the control signal $V_{out2}$, and the modulated base band signal from the low pass filter 703 is connected to ground. That is, no energy variation due to the DC offset is output to the microcontroller 80.

Contrarily, when there is no base band signal input to the circuit, the microcontroller 80 controls the switch SW to turn on via the control signal $V_{out2}$. The low pass filter 703 filters the high frequency elements of the modulated base band signal, and the modulated base band signal without the high frequency elements is output to microcontroller 80 via the A/D converter 704. That is, the energy variation due to the DC offset is output to the microcontroller 80, and the microcontroller 80 regulates the DC offset regulation signals IA, IB, QA, and QB output from the D/A converter assembly 30 to minimize the energy variation detected by the detecting module 70.

Therefore, the microcontroller 80 controls the on/off of the switch SW to control output of the low pass filter 60, which further controls the circuit to cancel the DC offset or not.

Figure 3:
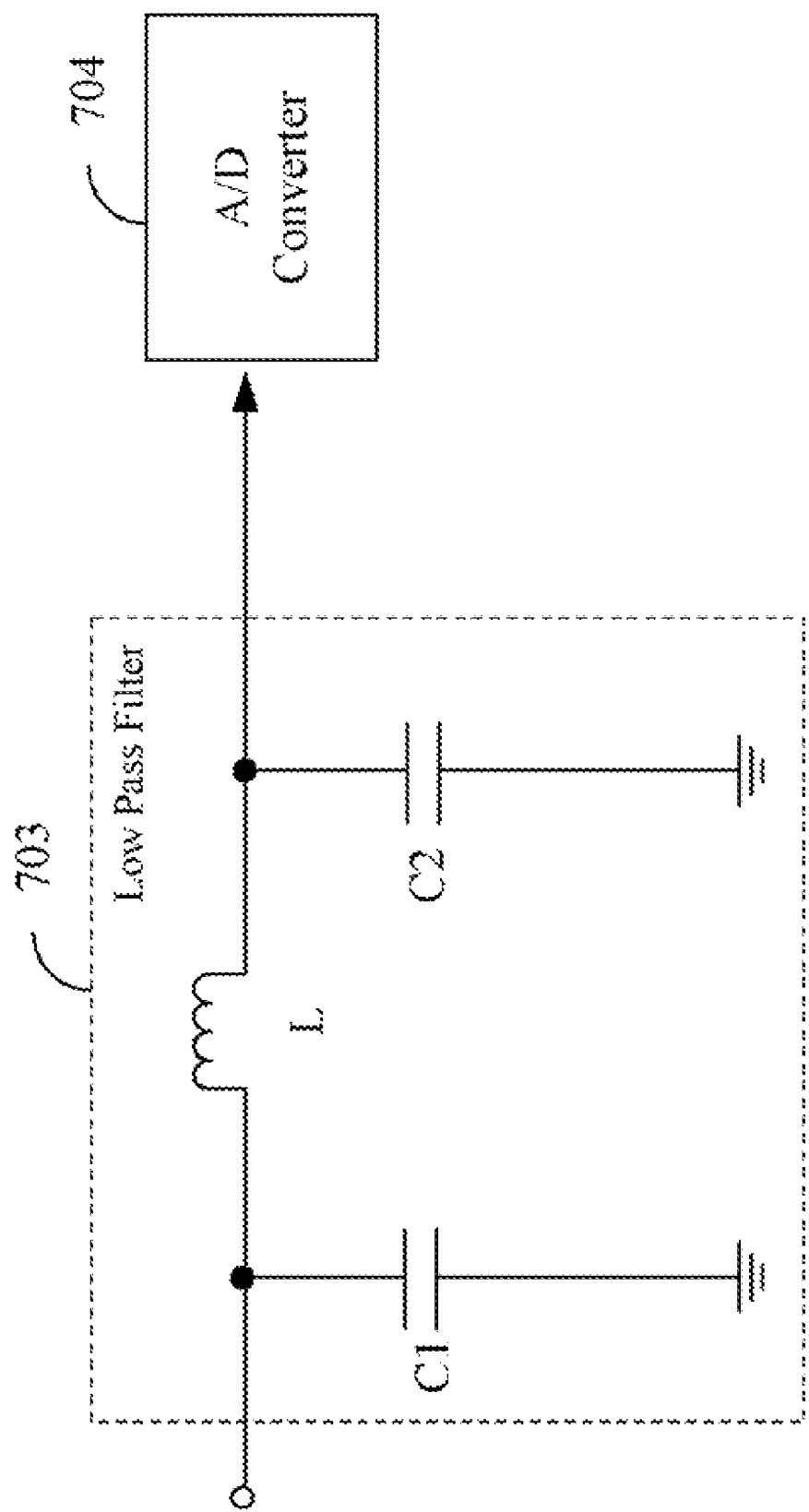
FIG. 3 is a detailed circuit diagram of the low pass filter of FIG. 2 of the present invention.

FIG. 3 is a detailed circuit diagram of the low pass filter 703 of FIG. 2. The low pass filter 703 includes an inductance L and two capacitors C1, C2. The inductance L is connected between the mixer 702 and the A/D converter 704. One end of the inductance L is defined as input of the low pass filter 703, for receiving the modulated base band signal output from the mixer 702. The capacitor C1 is connected between the one end of the inductance L and ground. The capacitor C2 is connected between the other end of the inductance L and ground. In the exemplary embodiment, the low pass filter 703 bypasses the high frequency elements of the modulated base band signal to the ground. The DC offset of the modulated base band signal is stored at the capacitor C2. That is, high frequency elements of the modulated base band signal are filtered via the low pass filter 703, only the DC offset is output to the A/D converter 704.

Figure 4:
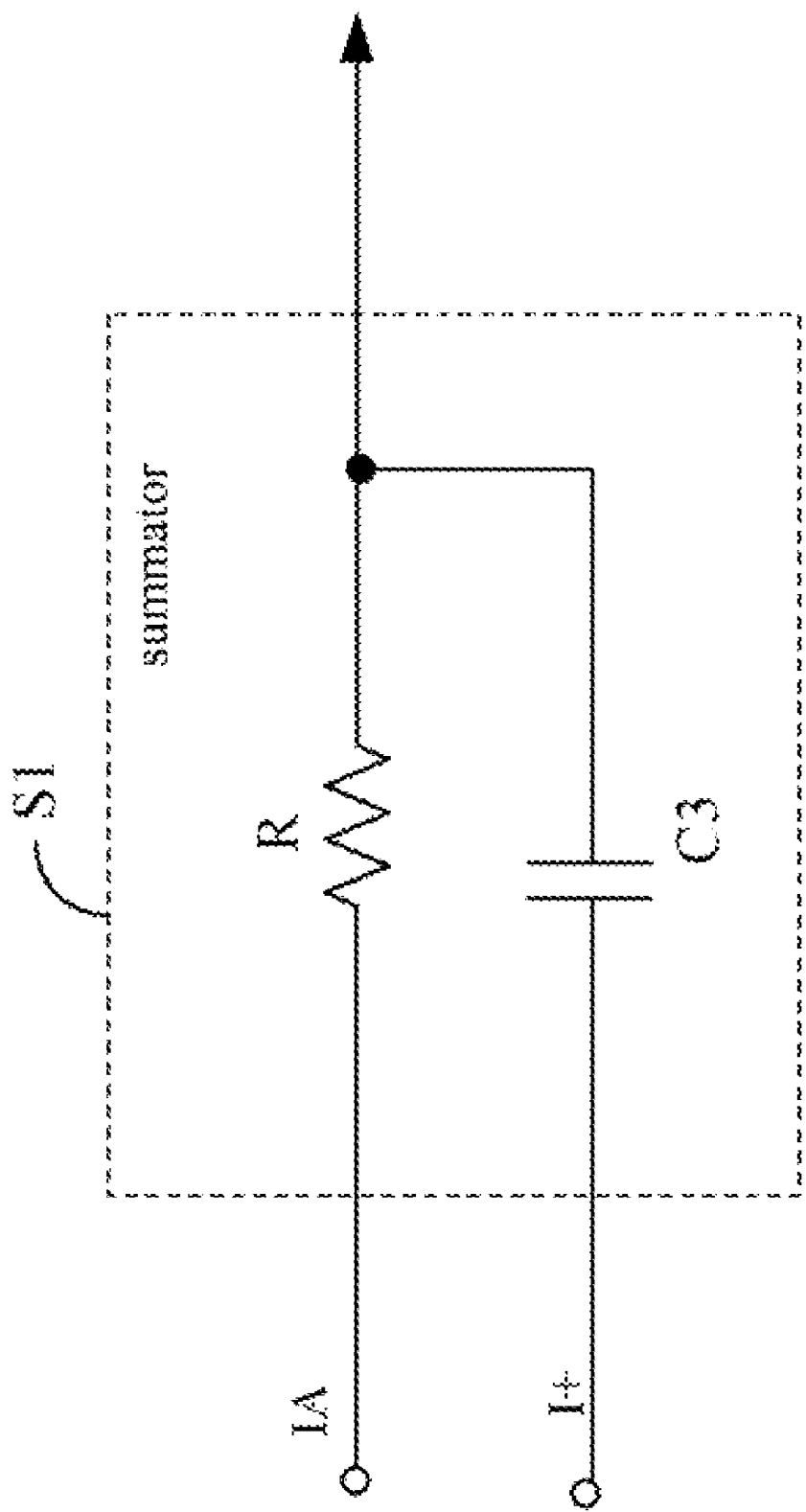
FIG. 4 is a detailed circuit diagram of a summator of FIG. 1 of the present invention.

FIG. 4 is a detailed circuit diagram of summator S1 of the summing circuit 40 of FIG. 1. In the exemplary embodiment, circuit structures between the summators S2, S3, S4 and the summator S1 are the same, thus, descriptions thereof are omitted. The summator S1 includes a resistor R and a capacitor C3. One end of the resistor R receives a DC offset regulation signal IA. The other end of the resistor R1 is defined as an output of the summator S1. One end of the capacitor C3 receives a differential base band signal I+, and the other end of the capacitor C3 is connected to the output of the summator S1. In the exemplary embodiment, the capacitor C3 isolates the DC signal of the differential base band signal vector I+, and sums up the differential base band signal vector I+ and the DC offset regulation signal IA, and output the summed base band signal to the I/Q modulator 50. In alternative exemplary embodiments, the summator S1 can be an operational amplifier.

In the invention, the circuit utilizes the microcontroller 80 to minimize DC offset. When DC offset of the circuit is minimized, the corresponding DC offset regulation signals IA, IB, QA, and QB are optimum DC offset regulation signals. Then, the base band signal is converted according to the optimum DC offset regulation signal, which can save energy in a communication network.

While various embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalent.

What is claimed is:

1. A circuit for canceling direct current (DC) offset in a communication system, comprising:

a digital-to-analog (D/A) converter assembly, for converting digital DC offset regulation signals to analog DC offset regulation signals;

a summing circuit, for summing up the DC offset regulation signals and corresponding vectors of a received base band signal;

an inphase-to-quadrature (I/Q) modulator, for receiving the summed base band signal, and converting the summed base band signal to a radio frequency (RF) signal;

a detecting module, for detecting an energy variation due to DC offset contained in the radio frequency (RF) signal;

a microcontroller, for regulating the DC offset regulation signals output from the D/A converter assembly to minimize the energy variation detected by the detecting module; and a multiplexer connected between the D/A converter assembly and the microcontroller.

2. The circuit as claimed in claim 1, further comprising a band pass filter, connected between the I/Q modulator and the detecting module, for filtering RF signals outer of the normal operation band.

3. The circuit as claimed in claim 1, wherein the detecting module comprises:

a mixer, for modulating the RF signal to another base band signal;

a low pass filter, for filtering high frequency elements of the modulated base band signal; and an analog-to-digital (A/D) converter, for converting filtered base band signal output from the low pass filter to a digital base band signal.

4. The circuit as claimed in claim 3, further comprising an isolating module, for preventing the RF signal output from the detecting module from being transmitted to the I/Q modulator.

5. The circuit as claimed in claim 3, further comprising a local oscillator, electrically connected to the mixer, for providing a carrier wave signal to the mixer.

6. The circuit as claimed in claim 5, wherein the mixer is electrically connected to the I/Q modulator, for providing another carrier wave signal to the I/Q modulator.

7. The circuit as claimed in claim 3, wherein the low pass filter comprises:
- an inductance, connected between the mixer and the A/D converter;
- a first capacitor, connected between one end of the inductance and ground, and
- a second capacitor, connected between the other end of the inductance and ground.

8. The circuit as claimed in claim 3, further comprising a switch, connected between the low pass filter and ground, for controlling an output of the low pass filter.

9. The circuit as claimed in claim 8, wherein a control signal of the microcontroller is output to the switch, for controlling on/off of the switch.

10. The circuit as claimed in claim 1, wherein the summing circuit comprises a plurality of summators, for summing up the DC offset regulation signals and the corresponding vectors of the received base band signal.

11. The circuit as claimed in claim 10, wherein each of the summators comprises:
- a resistor having one end for receiving the DC offset regulation signal, and the other end being defined as an output of the summator; and
- a third capacitor having one end for receiving the base band signal, and the other end connected to the output of the summator.

12. The circuit as claimed in claim 1, wherein the base band signal comprises vectors I and Q.

13. The circuit as claimed in claim 12, further comprising a differential amplifier assembly connected to the summing circuit, for converting the vectors I and Q to differential vectors I and Q, and transmitting the differential vectors I and Q to the summing circuit.

* * * * *